US008393160B2

(12) United States Patent
Prabhu

(10) Patent No.: US 8,393,160 B2
(45) Date of Patent: Mar. 12, 2013

(54) MANAGING LEAKS IN A GAS TURBINE SYSTEM

(75) Inventor: Edan Prabhu, Mission Viejo, CA (US)

(73) Assignee: Flex Power Generation, Inc., Irvine, CA (US)

( * ) Notice: Subject to any disclaimer, the term of this patent is extended or adjusted under 35 U.S.C. 154(b) by 1055 days.

(21) Appl. No.: 12/288,238

(22) Filed: Oct. 17, 2008

(65) Prior Publication Data

US 2009/0100821 A1    Apr. 23, 2009

Related U.S. Application Data

(63) Continuation-in-part of application No. 12/050,734, filed on Mar. 18, 2008.

(60) Provisional application No. 61/007,924, filed on Oct. 26, 2007, provisional application No. 61/007,917, filed on Oct. 23, 2007.

(51) Int. Cl.
*F02C 9/46*     (2006.01)
*F02G 3/00*     (2006.01)

(52) U.S. Cl. ...................................... 60/779; 60/39.091

(58) Field of Classification Search .................... 60/772, 60/774, 779, 39.091, 39.17
See application file for complete search history.

(56) References Cited

U.S. PATENT DOCUMENTS

| | | | |
|---|---|---|---|
| 2,303,381 A | 12/1942 | New | |
| 2,433,932 A | 1/1948 | Stosick | |
| 2,443,841 A | 6/1948 | Sweeny et al. | |
| 2,624,172 A | 1/1953 | Houdry | |
| 2,630,678 A * | 3/1953 | Pratt | 60/804 |
| 2,655,786 A | 10/1953 | Carr | |
| 2,795,054 A | 6/1957 | Bowen, III | |
| 3,313,103 A | 4/1967 | Johnson | |
| 3,661,497 A | 5/1972 | Castellucci et al. | |
| 3,731,485 A | 5/1973 | Rudolph et al. | |
| 3,732,911 A | 5/1973 | Lowe et al. | |
| 3,769,922 A | 11/1973 | Furlong et al. | |
| 3,790,350 A | 2/1974 | Haensel | |
| 3,797,231 A | 3/1974 | McLean | |
| 3,810,732 A | 5/1974 | Koch | |
| 3,928,961 A | 12/1975 | Pfefferle | |
| 3,942,264 A | 3/1976 | Zenkner | |
| 3,943,705 A | 3/1976 | DeCorso et al. | |
| 3,975,900 A | 8/1976 | Pfefferle | |
| 4,052,143 A | 10/1977 | Sandviknes | |

(Continued)

FOREIGN PATENT DOCUMENTS

| | | |
|---|---|---|
| CH | 319366 A | 2/1957 |
| GB | 2080934 | 2/1982 |

(Continued)

OTHER PUBLICATIONS

"Flameless Thermal Oxidizers"; [online][Retrieved on May 13, 2010] Retrieved from the Internet URL:http://www.selasfluid.com/International/Web/LE/US/likelesfus.nsf/docbyalias/Flameless_Thermal, Copyright 2008, 3 pages.

(Continued)

*Primary Examiner* — Gerald Sung
(74) *Attorney, Agent, or Firm* — McDermott Will & Emery LLP

(57) ABSTRACT

A mixture of air and fuel is compressed in a compressor of a gas turbine system. The gas turbine system includes components that define one or more fuel leak locations, and leaked fuel is directed from the one or more leak locations to a reaction chamber of the gas turbine system. At least a portion of the leaked fuel is oxidized in the reaction chamber. The energy released by oxidation of the leaked fuel can be converted to mechanical motion.

10 Claims, 9 Drawing Sheets

U.S. PATENT DOCUMENTS

| | | | |
|---|---|---|---|
| 4,111,644 A | 9/1978 | Buckholdt | |
| 4,125,359 A | 11/1978 | Lempa | |
| 4,163,366 A | 8/1979 | Kent | |
| 4,168,950 A | 9/1979 | Seemann et al. | |
| 4,187,672 A | 2/1980 | Rasor | |
| 4,192,642 A | 3/1980 | Lempa | |
| 4,202,169 A | 5/1980 | Acheson et al. | |
| 4,209,303 A | 6/1980 | Ricks | |
| 4,221,558 A | 9/1980 | Santisi | |
| 4,239,481 A | 12/1980 | Morck, Jr. | |
| 4,252,070 A | 2/1981 | Benedick | |
| 4,289,475 A | 9/1981 | Wall et al. | |
| 4,321,790 A | 3/1982 | Vadas et al. | |
| 4,361,478 A | 11/1982 | Gengler et al. | |
| 4,379,689 A | 4/1983 | Morck, Jr. | |
| 4,400,356 A | 8/1983 | McVay et al. | |
| 4,416,620 A | 11/1983 | Morck | |
| 4,418,530 A | 12/1983 | Bodrov et al. | |
| 4,442,901 A | 4/1984 | Zison | |
| 4,447,690 A | 5/1984 | Grever | |
| 4,449,918 A | 5/1984 | Spahr | |
| 4,467,610 A | 8/1984 | Pearson et al. | |
| 4,469,176 A | 9/1984 | Zison et al. | |
| 4,472,935 A | 9/1984 | Acheson et al. | |
| 4,487,573 A | 12/1984 | Gottschlich et al. | |
| 4,493,770 A | 1/1985 | Moilliet | |
| 4,509,333 A | 4/1985 | Nussdorfer et al. | |
| 4,509,374 A | 4/1985 | Sugimoto et al. | |
| 4,534,165 A | 8/1985 | Davis, Jr. et al. | |
| 4,643,667 A | 2/1987 | Fleming | |
| 4,646,660 A | 3/1987 | Bjorkman et al. | |
| 4,681,612 A | 7/1987 | O'Brien et al. | |
| 4,688,495 A | 8/1987 | Galloway | |
| 4,733,528 A | 3/1988 | Pinto | |
| 4,741,690 A | 5/1988 | Heed | |
| 4,754,607 A | 7/1988 | Mackay | |
| 4,769,149 A | 9/1988 | Nobilet et al. | |
| 4,794,753 A | 1/1989 | Beebe | |
| 4,823,711 A | 4/1989 | Kroneberger et al. | |
| 4,828,481 A | 5/1989 | Weil et al. | |
| 4,838,782 A | 6/1989 | Wills | |
| 4,850,857 A | 7/1989 | Obermuller | |
| 4,864,811 A | 9/1989 | Pfefferle | |
| 4,870,824 A | 10/1989 | Young et al. | |
| 4,874,310 A | 10/1989 | Seemann et al. | |
| 4,941,415 A | 7/1990 | Pope et al. | |
| 4,953,512 A | 9/1990 | Italiano | |
| 4,974,530 A | 12/1990 | Lyon | |
| 5,003,773 A | 4/1991 | Beckwith | |
| 5,044,931 A | 9/1991 | Van Eerden et al. | |
| 5,059,405 A | 10/1991 | Watson et al. | |
| 5,108,717 A | 4/1992 | Deller et al. | |
| 5,131,838 A | 7/1992 | Gensler et al. | |
| 5,154,599 A | 10/1992 | Wunning | |
| 5,161,366 A | 11/1992 | Beebe | |
| 5,165,884 A | 11/1992 | Martin et al. | |
| 5,183,401 A | 2/1993 | Dalla Betta et al. | |
| 5,190,453 A | 3/1993 | Le et al. | |
| 5,232,357 A | 8/1993 | Dalla Betta et al. | |
| 5,248,251 A | 9/1993 | Dalla Betta et al. | |
| 5,250,489 A | 10/1993 | Dalla Betta et al. | |
| 5,258,349 A | 11/1993 | Dalla Betta et al. | |
| 5,259,754 A | 11/1993 | Dalla Betta et al. | |
| 5,263,314 A | 11/1993 | Anderson | |
| 5,271,729 A | 12/1993 | Gensler et al. | |
| 5,271,809 A | 12/1993 | Holzhausen | |
| 5,281,128 A | 1/1994 | Dalla Betta et al. | |
| 5,285,123 A | 2/1994 | Kataoka et al. | |
| 5,320,518 A | 6/1994 | Stilger et al. | |
| 5,326,253 A | 7/1994 | Dalla Betta et al. | |
| 5,326,537 A | 7/1994 | Cleary | |
| 5,329,757 A | 7/1994 | Faulkner et al. | |
| 5,329,955 A | 7/1994 | Gensler et al. | |
| 5,384,051 A | 1/1995 | McGinness | |
| 5,405,260 A | 4/1995 | Della Betta et al. | |
| 5,406,704 A | 4/1995 | Retallick | |
| 5,425,632 A | 6/1995 | Tsurumi et al. | |
| 5,461,864 A | 10/1995 | Betta et al. | |
| 5,506,363 A | 4/1996 | Grate et al. | |
| 5,511,972 A | 4/1996 | Dalla Betta et al. | |
| 5,512,250 A | 4/1996 | Betta et al. | |
| 5,518,697 A | 5/1996 | Dalla Betta et al. | |
| 5,524,432 A | 6/1996 | Hansel | |
| 5,524,599 A | 6/1996 | Kong et al. | |
| 5,533,890 A | 7/1996 | Holst et al. | |
| 5,557,014 A | 9/1996 | Grate et al. | |
| 5,560,128 A | 10/1996 | Marega et al. | |
| 5,592,811 A | 1/1997 | Dodge et al. | |
| 5,601,790 A | 2/1997 | Stilger et al. | |
| 5,635,139 A | 6/1997 | Holst et al. | |
| 5,637,283 A | 6/1997 | Stilger et al. | |
| 5,650,128 A | 7/1997 | Holst et al. | |
| 5,685,156 A | 11/1997 | Willis et al. | |
| 5,697,776 A | 12/1997 | Van Eerden et al. | |
| 5,709,541 A | 1/1998 | Gensler et al. | |
| 5,770,584 A | 6/1998 | Kucera et al. | |
| 5,770,784 A | 6/1998 | Heywood et al. | |
| 5,806,298 A | 9/1998 | Klosek et al. | |
| 5,817,286 A | 10/1998 | Martin et al. | |
| 5,819,524 A | 10/1998 | Bosley et al. | |
| 5,819,673 A | 10/1998 | Heywood et al. | |
| 5,832,713 A | 11/1998 | Maese et al. | |
| 5,842,357 A | 12/1998 | Siwajek et al. | |
| 5,850,731 A | 12/1998 | Beebe et al. | |
| 5,850,733 A | 12/1998 | Bosley et al. | |
| 5,857,419 A | 1/1999 | Van Eerden et al. | |
| 5,862,858 A | 1/1999 | Wellington et al. | |
| 5,895,599 A | 4/1999 | Nivoche | |
| 5,921,763 A | 7/1999 | Martin | |
| 5,944,503 A | 8/1999 | Van Eerden et al. | |
| 6,017,172 A | 1/2000 | Ukegawa et al. | |
| 6,019,172 A | 2/2000 | Wellington et al. | |
| 6,033,207 A | 3/2000 | Cummings | |
| 6,053,699 A | 4/2000 | Turnquist et al. | |
| 6,070,404 A | 6/2000 | Bosley et al. | |
| 6,095,793 A | 8/2000 | Greeb | |
| 6,107,693 A | 8/2000 | Mongia et al. | |
| 6,109,018 A | 8/2000 | Rostrup-Nielsen et al. | |
| 6,116,014 A | 9/2000 | Dalla Betta et al. | |
| 6,141,953 A | 11/2000 | Mongia et al. | |
| 6,158,222 A | 12/2000 | Retallick | |
| 6,164,908 A | 12/2000 | Nishida et al. | |
| 6,205,768 B1 | 3/2001 | Dibble et al. | |
| 6,217,832 B1 | 4/2001 | Betta et al. | |
| 6,226,976 B1 | 5/2001 | Scott et al. | |
| 6,251,347 B1 | 6/2001 | Campbell et al. | |
| 6,257,869 B1 | 7/2001 | Martin et al. | |
| 6,261,093 B1 | 7/2001 | Matros et al. | |
| 6,269,882 B1 | 8/2001 | Wellington et al. | |
| 6,313,544 B1 | 11/2001 | Mongia et al. | |
| 6,334,769 B1 | 1/2002 | Retallick et al. | |
| 6,339,924 B1 | 1/2002 | Hoyer et al. | |
| 6,339,925 B1 | 1/2002 | Hung et al. | |
| 6,345,495 B1 | 2/2002 | Cummings | |
| 6,391,267 B1 | 5/2002 | Martin et al. | |
| 6,393,727 B1 | 5/2002 | Seelig et al. | |
| 6,393,821 B1 | 5/2002 | Prabhu | |
| 6,469,181 B1 | 10/2002 | Gruber et al. | |
| 6,487,860 B2 | 12/2002 | Mayersky et al. | |
| 6,497,615 B1 | 12/2002 | Klager | |
| 6,521,566 B1 | 2/2003 | Magno et al. | |
| 6,539,720 B2 | 4/2003 | Rouse et al. | |
| 6,551,068 B2 | 4/2003 | Blotenberg | |
| 6,595,001 B2 | 7/2003 | Rautenbach et al. | |
| 6,612,112 B2 | 9/2003 | Gilbreth et al. | |
| 6,634,176 B2 | 10/2003 | Rouse et al. | |
| 6,639,328 B2 | 10/2003 | Wacknov | |
| 6,655,137 B1 | 12/2003 | Sardari | |
| 6,657,332 B2 | 12/2003 | Balas | |
| 6,657,348 B2 | 12/2003 | Qin et al. | |
| 6,675,583 B2 | 1/2004 | Willis et al. | |
| 6,696,130 B1 | 2/2004 | Kasai et al. | |
| 6,698,412 B2 | 3/2004 | Dalla Betta | |
| 6,715,296 B2 | 4/2004 | Bakran et al. | |
| 6,718,772 B2 | 4/2004 | Dalla Betta et al. | |
| 6,720,685 B2 | 4/2004 | Balas | |
| 6,732,531 B2 | 5/2004 | Dickey | |

| | | |
|---|---|---|
| 6,747,372 B2 | 6/2004 | Gilbreth et al. |
| 6,748,742 B2 | 6/2004 | Rouse et al. |
| 6,751,941 B2 | 6/2004 | Edelman et al. |
| 6,784,565 B2 | 8/2004 | Wall et al. |
| 6,787,933 B2 | 9/2004 | Claude et al. |
| 6,796,129 B2 | 9/2004 | Yee et al. |
| 6,804,946 B2 | 10/2004 | Willis et al. |
| 6,810,678 B1 | 11/2004 | Luk |
| 6,812,586 B2 | 11/2004 | Wacknov et al. |
| 6,812,587 B2 | 11/2004 | Gilbreth et al. |
| 6,815,932 B2 | 11/2004 | Wall |
| 6,824,328 B1 | 11/2004 | Vinegar et al. |
| 6,832,480 B1 | 12/2004 | Anguil |
| 6,864,595 B2 | 3/2005 | Wall |
| 6,892,542 B2 | 5/2005 | Voinov |
| 6,895,760 B2 | 5/2005 | Kesseli |
| RE38,784 E | 8/2005 | Maese et al. |
| 6,923,001 B2 | 8/2005 | Laster et al. |
| RE38,815 E * | 10/2005 | Maese et al. ............. 60/783 |
| 6,951,110 B2 | 10/2005 | Kang |
| 6,960,840 B2 | 11/2005 | Willis et al. |
| 6,962,055 B2 | 11/2005 | Chen et al. |
| 7,007,486 B2 | 3/2006 | Sprouse et al. |
| 7,007,487 B2 | 3/2006 | Belokon et al. |
| 7,017,329 B2 | 3/2006 | Farhangi et al. |
| 7,045,913 B2 | 5/2006 | Ebrahim et al. |
| 7,053,590 B2 | 5/2006 | Wang |
| 7,062,917 B2 | 6/2006 | Wunning et al. |
| 7,093,445 B2 | 8/2006 | Corr, II et al. |
| 7,096,671 B2 | 8/2006 | Bland et al. |
| 7,117,676 B2 * | 10/2006 | Farhangi et al. ............. 60/736 |
| 7,117,694 B2 | 10/2006 | Braun et al. |
| 7,121,097 B2 | 10/2006 | Yee et al. |
| 7,124,589 B2 | 10/2006 | Neary |
| 7,140,188 B2 | 11/2006 | Hosokawa et al. |
| 7,168,949 B2 | 1/2007 | Zinn et al. |
| RE39,596 E | 5/2007 | Dodge et al. |
| 7,425,127 B2 | 9/2008 | Zinn et al. |
| 7,430,869 B2 | 10/2008 | Su et al. |
| 2002/0060556 A1 | 5/2002 | Wall |
| 2002/0063479 A1 | 5/2002 | Mitchell et al. |
| 2002/0066270 A1 | 6/2002 | Rouse et al. |
| 2002/0067872 A1 | 6/2002 | Weissert |
| 2002/0069648 A1 | 6/2002 | Levy et al. |
| 2002/0078694 A1 | 6/2002 | Nazeer et al. |
| 2002/0079760 A1 | 6/2002 | Vessa |
| 2002/0084702 A1 | 7/2002 | Balas |
| 2002/0096393 A1 | 7/2002 | Rouse |
| 2002/0096959 A1 | 7/2002 | Qin et al. |
| 2002/0097928 A1 | 7/2002 | Swinton et al. |
| 2002/0104316 A1 | 8/2002 | Dickey et al. |
| 2002/0125779 A1 | 9/2002 | Qin et al. |
| 2002/0128076 A1 | 9/2002 | Lubell |
| 2002/0166324 A1 | 11/2002 | Willis et al. |
| 2003/0102730 A1 | 6/2003 | Balas |
| 2003/0110773 A1 | 6/2003 | Rouse et al. |
| 2003/0111842 A1 | 6/2003 | Gilbreth et al. |
| 2003/0157395 A1 | 8/2003 | Ren et al. |
| 2003/0192318 A1 | 10/2003 | Sprouse et al. |
| 2003/0192319 A1 | 10/2003 | Sprouse et al. |
| 2004/0003598 A1 | 1/2004 | Farhangi |
| 2004/0011523 A1 | 1/2004 | Sarada |
| 2004/0021235 A1 | 2/2004 | Corr et al. |
| 2004/0040312 A1 | 3/2004 | Hoffjann et al. |
| 2004/0074223 A1 | 4/2004 | Willis et al. |
| 2004/0100101 A1 | 5/2004 | Willis et al. |
| 2004/0103669 A1 | 6/2004 | Willis et al. |
| 2004/0119291 A1 | 6/2004 | Hamrin et al. |
| 2004/0129188 A1 | 7/2004 | Traina |
| 2004/0148942 A1 | 8/2004 | Pont et al. |
| 2004/0160061 A1 | 8/2004 | Rouse et al. |
| 2004/0167270 A1 | 8/2004 | Chang et al. |
| 2004/0178641 A1 | 9/2004 | Wall |
| 2004/0255588 A1 | 12/2004 | Lundberg et al. |
| 2005/0076648 A1 | 4/2005 | Farhangi |
| 2005/0196714 A1 | 9/2005 | Carroni et al. |
| 2005/0201909 A1 | 9/2005 | Carroni et al. |
| 2006/0016195 A1 | 1/2006 | Dalla et al. |
| 2006/0037432 A1 | 2/2006 | Deevi et al. |
| 2006/0049080 A1 | 3/2006 | Bacha et al. |
| 2006/0052499 A1 | 3/2006 | Chang et al. |
| 2006/0054318 A1 | 3/2006 | Sarada |
| 2006/0063845 A1 | 3/2006 | O'Rear et al. |
| 2006/0063869 A1 | 3/2006 | Chang et al. |
| 2006/0063870 A1 | 3/2006 | Chang et al. |
| 2006/0074134 A1 | 4/2006 | O'Rear et al. |
| 2006/0080968 A1 | 4/2006 | Griffin et al. |
| 2006/0096294 A1 | 5/2006 | Farhangi et al. |
| 2006/0096297 A1 | 5/2006 | Griffin et al. |
| 2006/0138022 A1 | 6/2006 | Miller et al. |
| 2006/0138024 A1 | 6/2006 | Miller et al. |
| 2006/0150635 A1 | 7/2006 | Su et al. |
| 2006/0196807 A1 | 9/2006 | Rosenbaum et al. |
| 2006/0199743 A1 | 9/2006 | Rosenbaum et al. |
| 2006/0202059 A1 | 9/2006 | Carroni et al. |
| 2006/0213183 A1 | 9/2006 | Althaus |
| 2006/0260308 A1 | 11/2006 | Ingersoll |
| 2006/0272331 A1 | 12/2006 | Bucker et al. |
| 2007/0054226 A1 | 3/2007 | Carroni et al. |
| 2007/0240425 A1 | 10/2007 | Malavasi et al. |
| 2009/0100820 A1 | 4/2009 | Prabhu |

FOREIGN PATENT DOCUMENTS

| | | |
|---|---|---|
| JP | 11013483 | 1/1999 |
| WO | WO 96/14370 | 5/1996 |
| WO | WO-01/92702 A1 | 12/2001 |

OTHER PUBLICATIONS

Prabhu, Edan, "Oxidizing Fuel in Multiple Operating Modes", U.S. Appl. No. 12/330,151, filed Dec. 8, 2008.

Prabhu, Edan, "Oxidizing Fuel", U.S. Appl. No. 12/050,734, filed Mar. 18, 2008.

Prabhu, Edan, "Distributing Fuel Flow in a Reaction Chamber", U.S. Appl. No. 12/772,622, filed May 3, 2010.

Stadler, H. "Experimental and Numerical Investigation of Flameless Pulverised Coal Combustion" <http://darwin.bth.rwth-aachen.de/opus3/voltexte/2010/pdf/3323.pdf>, Aug. 2010, retrieved Sep. 14, 2011.

* cited by examiner

MANAGING LEAKS IN A GAS TURBINE SYSTEM

CROSS-REFERENCE TO RELATED APPLICATIONS

This application claims the benefit of U.S. Provisional Application 61/007,924, filed Oct. 26, 2007, which is incorporated herein by reference. This application is also a continuation-in-part of U.S. application Ser. No. 12/050,734, filed Mar. 18, 2008, which claims the benefit of U.S. Provisional Application No. 61/007,917, filed Oct. 23, 2007, both of which are also incorporated herein by reference.

BACKGROUND

This disclosure relates to managing fuel-containing leaks in a gas turbine system. In a conventional gas turbine system, fuel is combusted as it is injected into pressurized air, thereby heating and increasing the energy of the gas. The energy is then extracted from the heated gas with a turbine that converts the energy into kinetic energy. The kinetic energy may be used to drive another device, for example, a generator. In some systems, fuel can leak internally within the gas turbine system or externally to an atmosphere of the gas turbine system, for example, due to pressure differentials across imperfect seals in the gas turbine system. In some instances, fuel leaks can be wasteful and/or hazardous.

SUMMARY

In certain aspects, a method for managing leaks containing fuel in a gas turbine system includes receiving a compressed air and fuel mixture at one or more junctions between components of the gas turbine system. Air and fuel mixture leaked from the one or more junctions is directed to a reaction chamber of the gas turbine system. At least a portion of the leaked air and fuel mixture is oxidized in the reaction chamber.

In certain aspects, a method for managing leaked fuel in a gas turbine system includes receiving a compressed air and fuel mixture at a leak location of the gas turbine system. The leak location leaks the air and fuel mixture from upstream of a primary reaction chamber of the gas turbine system to downstream of the primary reaction chamber. Air and fuel mixture leaked from the leak location is directed to a secondary reaction chamber of the gas turbine system. At least a portion of the leaked air and fuel mixture is oxidized in the secondary reaction chamber.

In certain aspects, a system includes a plurality of components defining a primary flow path through a gas turbine system. The components include an air and fuel mixer and a compressor coupled to the mixer. The compressor is adapted to compress an air and fuel mixture received from the mixer. The components also include a first reaction chamber coupled to the compressor. The first reaction chamber is adapted to receive the air and fuel mixture and oxidize at least a portion of the received mixture. A leak path leaks air and fuel mixture from the primary flow path upstream of the first reaction chamber to downstream of the first reaction chamber. A second reaction chamber is provided downstream of the first reaction chamber to receive and oxidize at least a portion of the leaked air and fuel mixture.

Embodiments of the aspects described above may include some or all of the following features. Energy released by oxidation of the air and fuel mixture leaked from the junctions is converted into mechanical motion. The reaction chamber and/or the second reaction chamber is a secondary reaction chamber downstream of a primary reaction chamber. The air and fuel mixture leaked from the junctions includes air and fuel mixture leaked to downstream of a primary reaction chamber of the gas turbine system. The leaked air and fuel mixture is directed into a compressor of the gas turbine system. The leaked air and fuel mixture is oxidized in the reaction chamber by raising a temperature of the air and fuel mixture to a temperature above an auto-ignition temperature of the fuel. Air and fuel mixture leaked from the junctions is collected in a leak collection envelope containing a compressor, the reaction chamber, and a turbine of the gas turbine system. The leak collection envelope can direct the collected air and fuel mixture to flow into the compressor.

The details of one or more embodiments are set forth in the accompanying drawings and the description below. Other features, objects, and advantages of the present disclosure will be apparent from the description and drawings, and from the claims.

DESCRIPTION OF DRAWINGS

Like reference symbols in the various drawings indicate like elements.

DETAILED DESCRIPTION

Figure 1A:
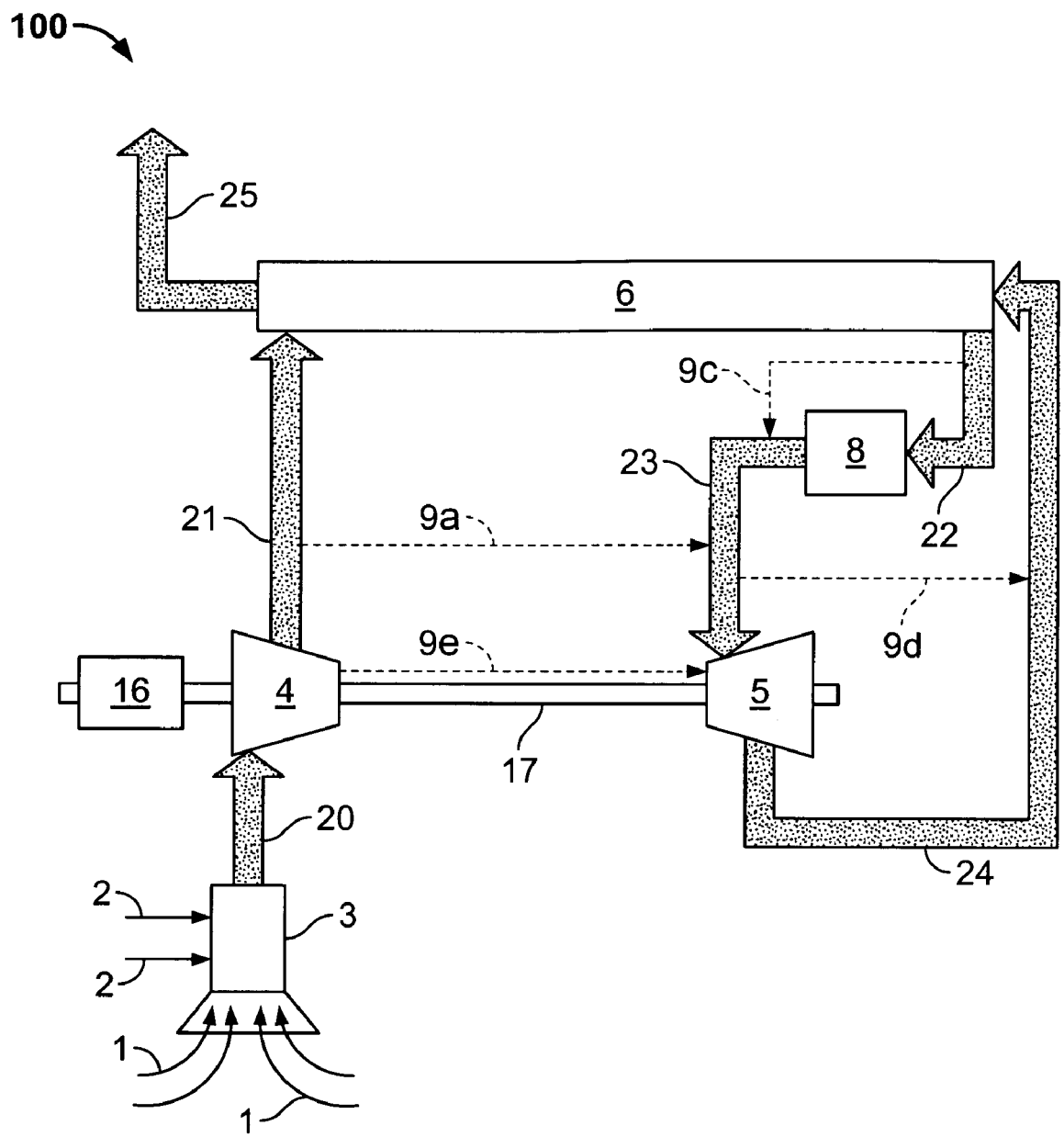
FIG. 1A is a block diagram illustrating an example gas turbine system.
Figure 1B:
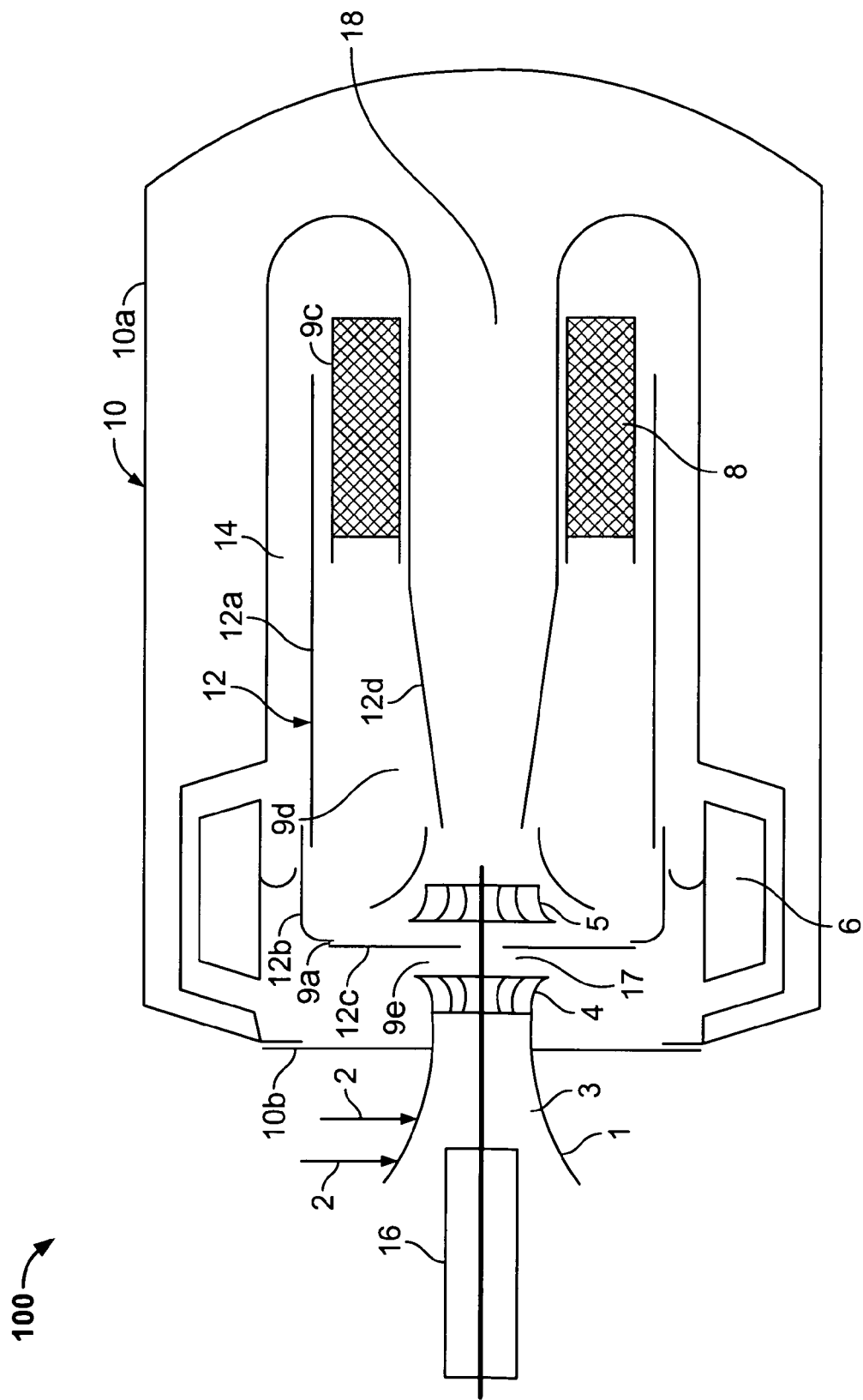
FIG. 1B is a diagram illustrating a cross-sectional view of an example implementation of the gas turbine system.

FIG. 1A is a block diagram and FIG. 1B is a schematic cross-sectional view, both illustrating an example gas turbine system 100. The example system 100 includes a number of components, including a reaction chamber 8, a air/fuel mixer 3, a compressor 4, a heat exchanger 6 (e.g. recuperator), a turbine 5, and a shaft 17 connecting the turbine 5 to the compressor 4. In some cases, the air/fuel mixer 3 and/or the heat exchanger 6 can be omitted. The system 100 may include different or additional elements that are not illustrated in FIG. 1A. For example, the system 100 may include an electronic control system, sensors, additional heat exchangers, valves, ports, a fuel supply, an air supply, and others. The system 100 can be a FlexPowerstation made by FlexEnergy, of Irvine, Calif. or another type of turbine system.

The dark arrows 20, 21, 22, 23, 24, and 25 of FIG. 1A illustrate a primary flow path through the system 100. According to the illustrated flow path, air and fuel (e.g. methane) are introduced into the air/fuel mixer 3 through air stream 1 and one or more fuel streams 2, respectively. The air/fuel mixer 3 mixes the air and fuel, and the compressor 4 pressurizes the resulting air and fuel mixture. For example, the compressor 4 may output a substantially homogeneous pressurized mixture of fuel and air. After exiting the compressor 4, the pressurized air and fuel mixture is then communicated to and heated by the heat exchanger 6. The heat exchanger 6 can communicate the heated, pressurized air and fuel mixture into the primary reaction chamber 8, where at least a portion of the fuel is oxidized.

The primary reaction chamber 8 performs the primary oxidation of the air and fuel mixture. The primary reaction chamber 8 can be a traditional combustion chamber that burns the fuel rapidly or almost instantaneously in a high temperature flame (e.g. substantially higher than the auto-ignition temperature of the fuel) and initiates the combustion reaction with an ignition source (e.g. a spark plug or another type of ignition source). The primary reaction chamber 8 may alternatively initiate an oxidation reaction using a fuel oxidation catalyst material (e.g. platinum) that effectively lowers the auto-ignition temperature of the fuel and enables oxidation of the fuel at a lower temperature. The primary reaction chamber 8 may be a non-catalytic gradual oxidation system that oxidizes fuel in a flameless combustion reaction initiated independent of a catalyst material. In some implementations, the fuel may not be fully oxidized as it passes through the primary reaction chamber 8.

Exhaust from the oxidation reaction exits the primary reaction chamber 8 and imparts mechanical (e.g. rotational) energy to the turbine 5. The exhaust may include some unoxidized fuel. Rotation of the turbine 5 provides power to the compressor 4 and/or a generator 16. From the turbine 5, the exhaust (which may include unoxidized fuel) may impart heat energy to the heat exchanger 6 and then exit the system 100. Unoxidized fuel in the exhaust entering the atmosphere can cause pollution that is harmful to the environment. For example, methane fuel has a global warming potential twenty-three times higher than carbon dioxide.

Referring specifically to FIG. 1B, the gas turbine system 100 has an annular recuperator housing 10 and an annular reaction chamber housing 12 formed within the recuperator housing 10. Together, the recuperator housing 10 and reaction chamber housing 12 cooperate to communicate flow around the gas turbine system 100. The recuperator housing 10 is formed in multiple parts, and in FIG. 1B, includes at least an outer housing 10a and an end housing 10b. The reaction chamber housing 12 is also formed in multiple parts, and includes a main body 12a, an intermediate body 12b, an end body 12c, and an inner body 12d. In the example of FIG. 1B, flow exiting the heat exchanger 6 is communicated in an annular conduit 14 between the recuperator housing 10 and the reaction chamber housing 12 into the reaction chamber housing 12. This flow corresponds to flow 22 of FIG. 1A. The reaction chamber housing 12 communicates the flow through the reaction chamber 8 to the turbine 5. This flow corresponds to flow 23 of FIG. 1A. Flow exiting the turbine 5 is communicated through a central conduit 18 in the interior of the reaction chamber housing 12 into the annular space within the recuperator housing 10, through the heat exchanger 6 and out of the system 100. This flow corresponds to flows 24 and 25 of FIG. 1A.

Depending on the design of the gas turbine system 100, there could be several points where the air and fuel mixture leaks past one or more components of the flow path through the system 100. Air and fuel mixture leaks could be internal, wherein the leaked fluid stays within the system 100. Internal leaks could by-pass the primary reaction chamber 8 and therefore cause unoxidized fuel to enter an exhaust stream and exit the system 100. Air and fuel mixture leaks could be external, wherein the leaked fluid directly exits the system 100 (e.g., other than through an exhaust stream).

One or more of the leak paths may be caused by imperfect seals across boundaries defined by an edge or a junction of moving and/or static parts. During operation, parts of the system 100 may expand or contract as temperatures and/or pressures in the system 100 increase or decrease, and this expanding or contracting of parts during operation can also cause air and/or fuel leaks. FIG. 1A shows several dashed arrows representing possible internal leak paths 9a, 9c, 9d and 9e. Paths 9a (at the junction between the end body 12c and intermediate body 12b) and 9c (at the junction between the main body 12a and reaction chamber 8 and at the junction between the main body 12a and the intermediate body 12b) bypass the primary reaction chamber 8 by communicating air and fuel mixture from upstream of the primary reaction chamber 8 to downstream of the primary reaction chamber 8 without being oxidized in the primary reaction chamber 8. Therefore, paths 9a and 9c can leak fuel into the atmosphere (e.g., with the exhaust). In some implementations, path 9d (at the junction between the turbine 5 and inner body 12d) can contain some unoxidized fuel and could therefore also leak fuel into the atmosphere through the exhaust stream.

Figure 2A:
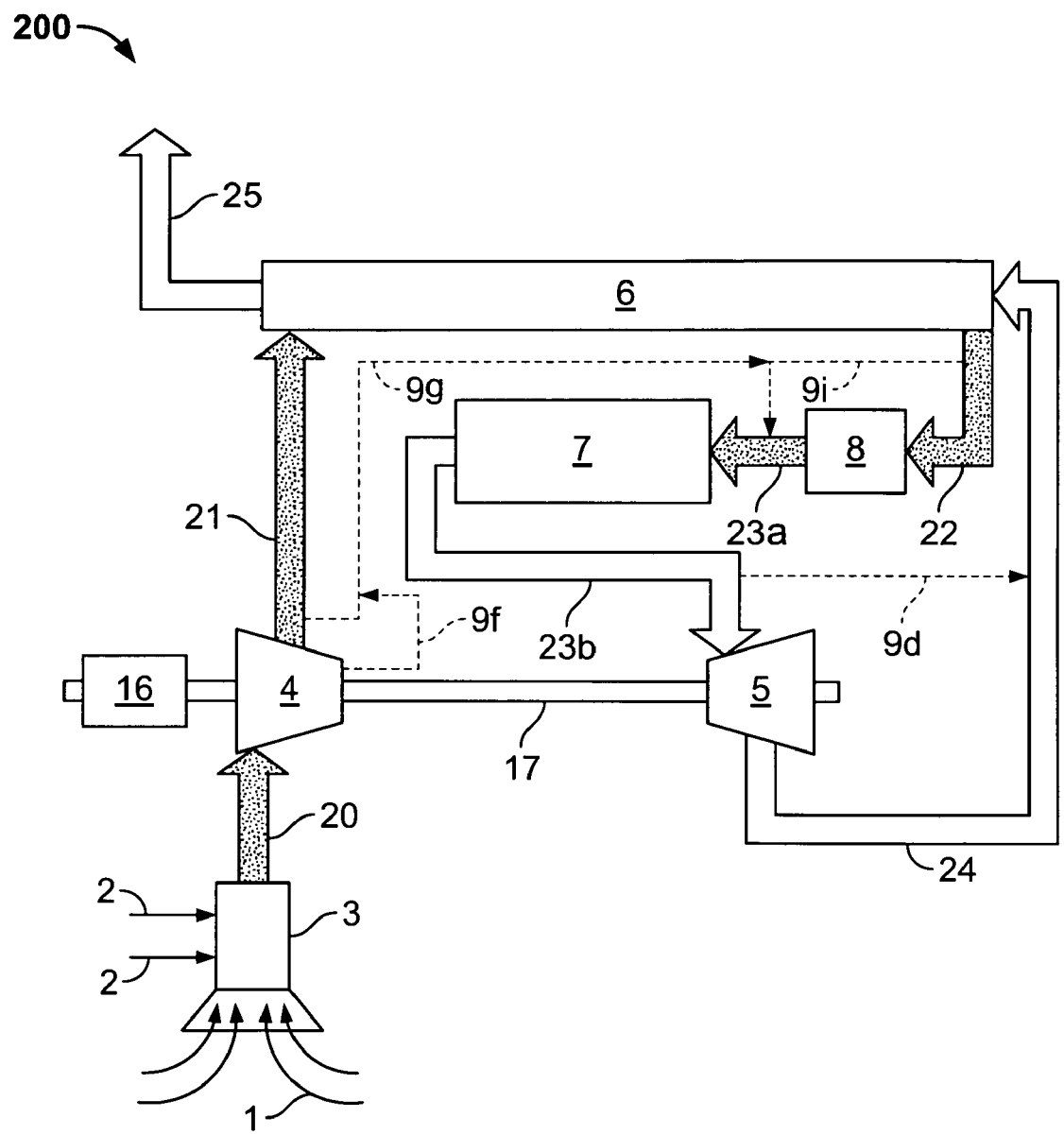
FIGS. 2A and 2B are block diagrams, each illustrating an example system for managing leaks in accordance with some aspects of the present disclosure.
Figure 2B:
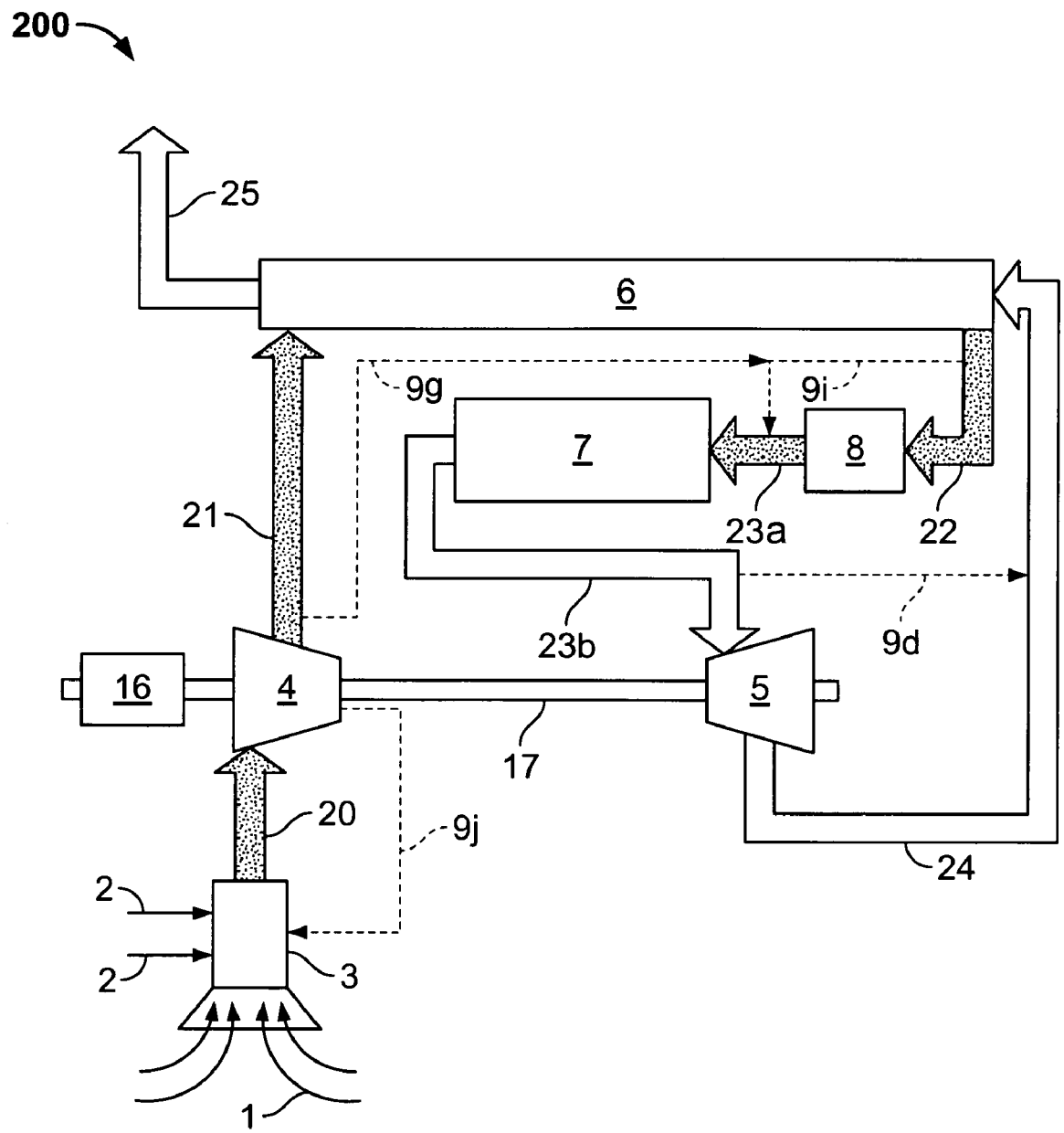
Figure 2C:
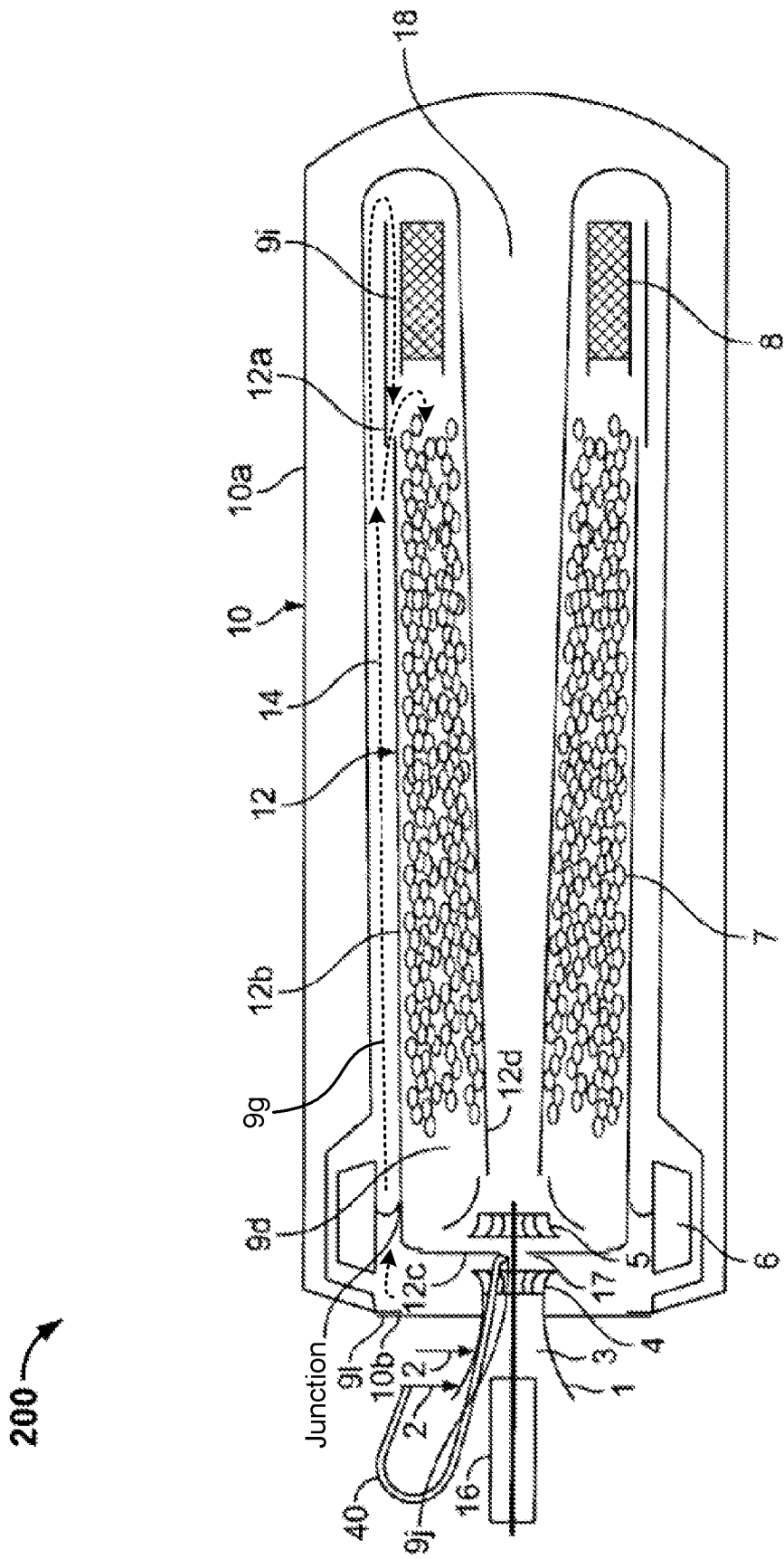
FIG. 2C is a diagram illustrating a cross-sectional view of an example implementation of the system for managing leaks.

FIGS. 2A and 2B illustrate an example of managing leaks in a gas turbine system 200 in accordance with some aspects of the present disclosure. FIG. 2C illustrates a cross-sectional view of an example implementation of the system 200. The system 200 includes a secondary reaction chamber 7. As illustrated, the secondary reaction chamber 7 divides the flow path 23 into two segments, 23a and 23b. The secondary reaction chamber 7 can reduce or eliminate the passage of unoxidized fuel from the flow path 23a into the flow path 23b. In some implementations, the secondary reaction chamber 7 can oxidize fuel substantially to completion, and the oxidation product entering the flow path 23b contains substantially no unoxidized fuel. The secondary reaction chamber 7 may be configured to oxidize low energy-density air and fuel mixtures. In some implementations, the secondary reaction chamber 7 may altogether replace the primary reaction chamber 8, and the primary reaction chamber 8 may therefore be omitted from the system 200.

The secondary reaction chamber 7 may be a large flow chamber and may include a flow path lined with insulating refractory material. The volume, shape, and/or other features of the chamber can be designed to provide a slow flow rate through the chamber, allowing sufficient time for the desired oxidation reactions to be completed. As an example, if the chamber is designed such that the average fluid flow rate is less than ten feet per second and the length of the chamber is ten feet, then the average dwell time of the gas in the chamber can be at least one second. High temperature heat-absorbing and/or heat-resistant material, such as ceramic or rock, may be provided in the secondary reaction chamber 7. The material in the secondary reaction chamber 7 can provide a thermal mass that facilitates slow oxidation of weak fuels flowing through the flow path of the secondary reaction chamber 7. The thermal mass of the secondary reaction chamber 7 may help stabilize temperatures for gradual oxidation of the air and fuel mixture. In some cases (e.g. when there is an oversupply of fuel in the reaction chamber), the thermal mass of the secondary reaction chamber 7 may act as a dampener, absorbing some heat and protecting the turbine. In other cases (e.g. when there is a low supply of fuel in the reaction chamber), the thermal mass of the secondary reaction chamber 7 may provide a temporary source of energy, which may help sustain oxidation of the fuel.

The secondary reaction chamber 7 may be designed such that under a range of operating conditions (e.g. at maximum flow and fuel conditions), sufficient time and temperature are provided to allow some or all of the fuels in the air and fuel mixture to gradually oxidize to completion. The secondary reaction chamber 7 may also be adapted to promote mixing and/or oxidation of materials in the flow path. For example, the secondary reaction chamber 7 may include flow diverters to control a dwell time (e.g. an amount of time a given volume of the air and fuel mixture traverses the flow path through the secondary reaction chamber 7) and/or to help maintain an oxidizer inlet temperature at or near a desired temperature (e.g. an auto-ignition temperature of the fuel or a different desired inlet temperature). As another example, the secondary reaction chamber 7 may include internal heat transfer zones, where a hotter section of the flow path imparts heat to a cooler section of the flow path.

The secondary reaction chamber 7 may also include one or more sensors for detecting properties such as temperature, pressure, flow rate, or other properties relevant to the startup and/or operation of the gas turbine system 200. The secondary reaction chamber 7 may include an ignition source (e.g. a spark plug) used during startup of the system 200. After startup, normal operation of the secondary reaction chamber 7 may proceed without use of the ignition source.

In some implementations, operation of the secondary reaction chamber 7 does not use or require a rapid combustion process or a catalyst material. Rather, the secondary reaction chamber 7 may initialize an oxidation reaction by raising the temperature of the air and fuel mixture above an auto-ignition temperature of one or more of the constituent fuels. The auto-ignition temperature may refer to the lowest temperature at which a gas (e.g. fuel) spontaneously oxidizes, without requiring an ignition source. Different fuels may have different auto-ignition temperatures. In some implementations, the secondary reaction chamber 7 uses at least one of a rapid combustion process, an ignition source, a high energy density fuel mixture, and/or a fuel oxidation catalyst material.

In FIGS. 2A-C, the illustrated fuel leaks 9f, 9g, and 9i are directed from the fuel leak locations to the secondary reaction chamber 7. When the pressure of the leaked fuel is substantially as high as the pressure of fluids entering the secondary reaction chamber 7 from the primary reaction chamber 8, the leaked fuel can be directed to enter the flow path near an inlet of the secondary reaction chamber 7. For example, FIG. 2A illustrates high pressure leak paths 9f (at the junction between the compressor drive shaft 17 and the end body 12c), 9g (at the junction between the heat exchanger 6 and the intermediate body 12b), and 9i (at the junction between the intermediate body 12b and the main body 12a and at the junction between the main body 12a and the primary reaction chamber 8). Paths 9g and 9i bypass the primary reaction chamber 8. The inlet to the secondary reaction chamber 7 resides downstream of the leak at the junction between the main body 12a and the intermediate body 12b, such that fuel leaked from 9g and 9i enters the secondary reaction chamber 7. High pressure leaks can also be directed elsewhere downstream of the compressor 4. When the pressure of the leaked fuel is substantially lower than the pressure of fluids entering the secondary reaction chamber 7, the leaked fuel can be directed to enter the flow path upstream of the compressor 4, so that the leaked fuel can be pressurized. For example, FIG. 2B illustrates a low pressure leak path 9j directed into the fuel intake 2 through a tube 40. From the fuel intake 2, fuel leaked through the leak path 9j is directed into the mixer 3 and then to the compressor 4.

Since the intake of the compressor 4 can be at or slightly below atmospheric pressure, the compressor 4 can accept low pressure fuel leaks.

By routing the fuel leaks upstream of the secondary reaction chamber 7, the amount of fuel entering the atmosphere from the gas turbine system can be reduced. For example, the flow paths 23b, 24, and 25 (illustrated as light arrows) may include substantially no unoxidized fuel. In the illustrated implementations of FIGS. 2A-C, since the flow path 23b includes substantially no unoxidized fuel, leak path 9d does not cause unoxidized fuel to enter the atmosphere.

Figure 3A:
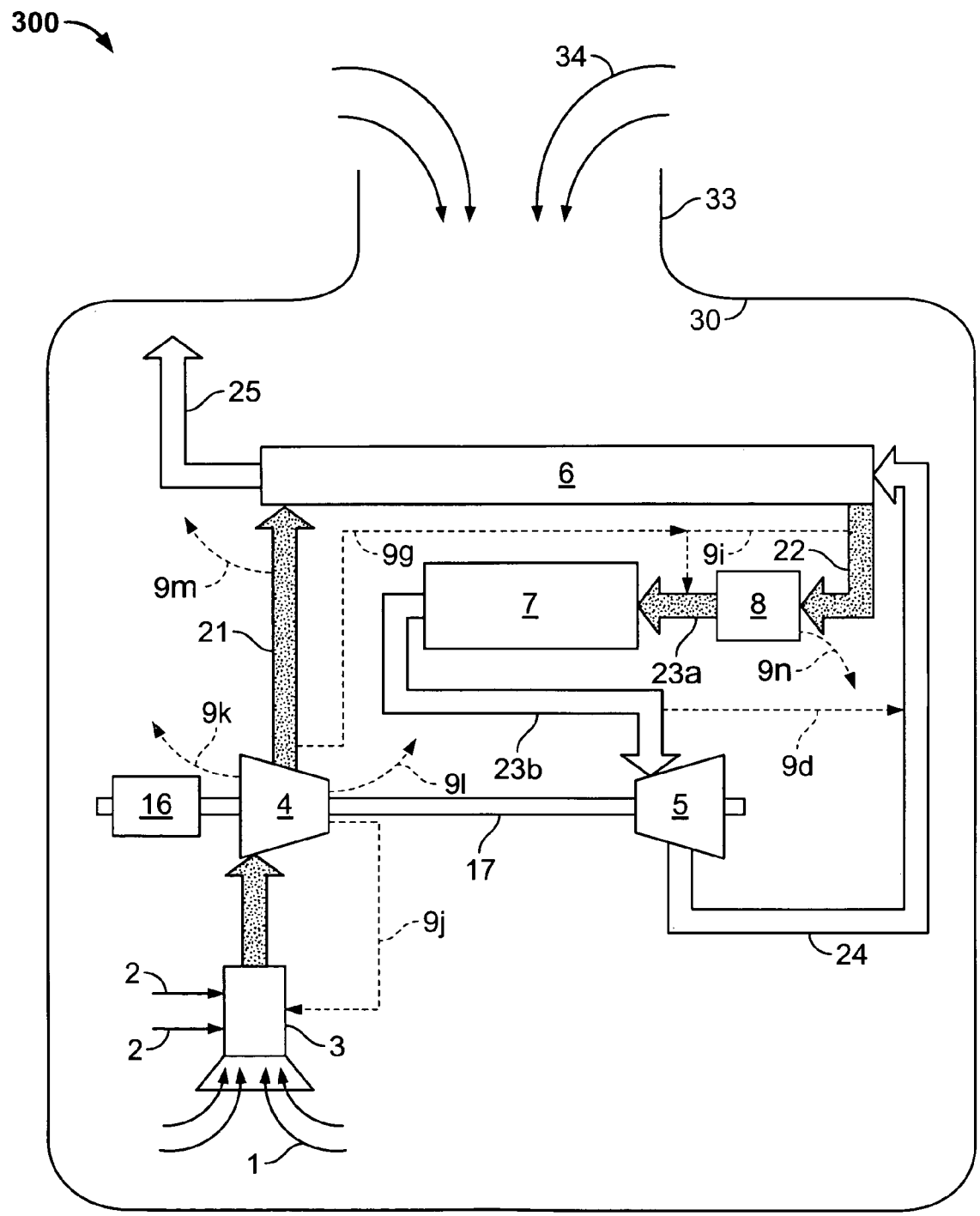
FIGS. 3A and 3B are block diagrams, each illustrating an example system for managing leaks in accordance with some aspects of the present disclosure.
Figure 3B:
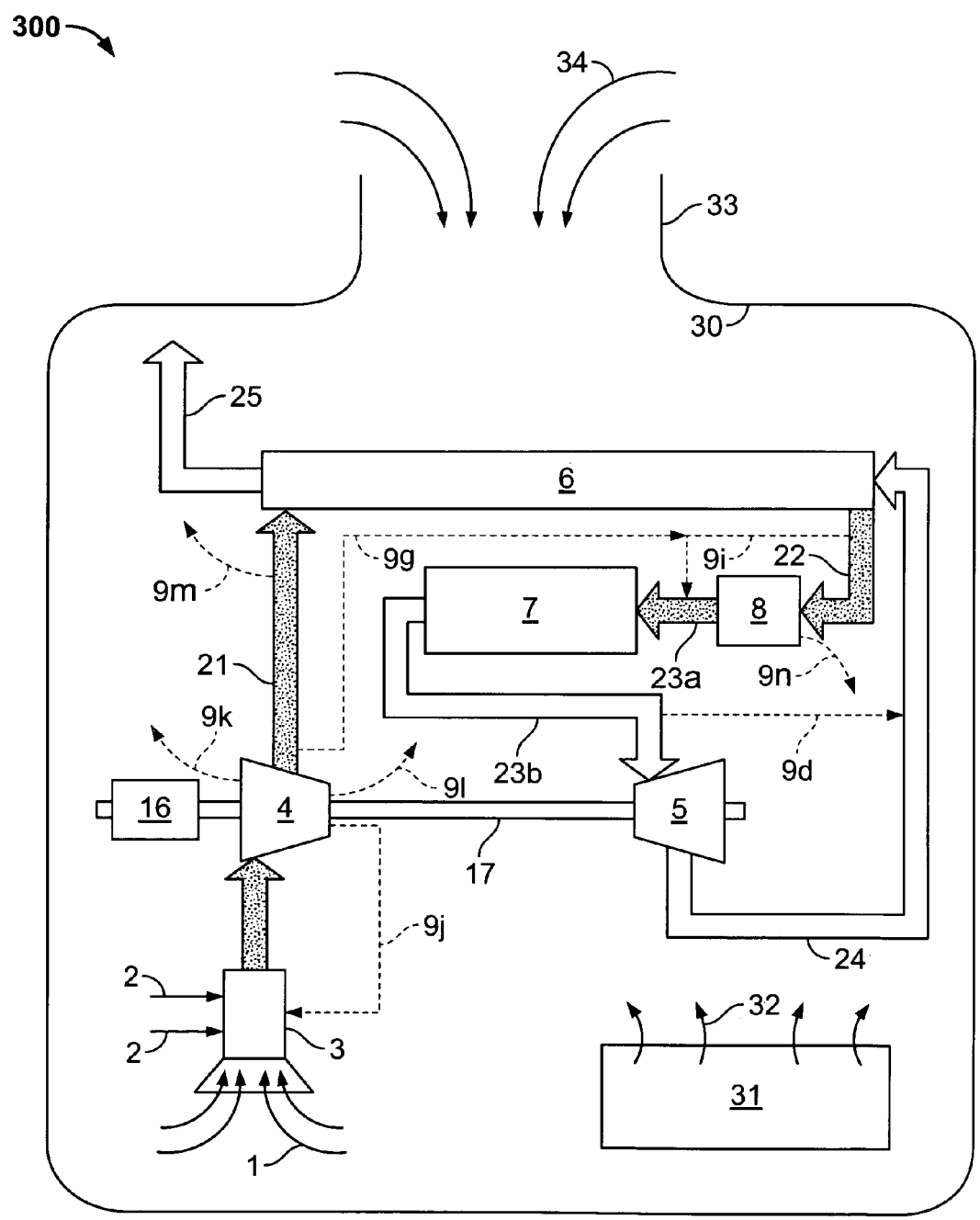

FIGS. 3A and 3B are block diagrams illustrating another example of managing fuel leaks from a gas turbine system 300. The system 300 allows the capture of fuel leaks even after the leaked fuel enters an atmosphere (e.g. a local environment) of the gas turbine system. The captured fuel can be oxidized in the secondary reaction chamber 7 (or the primary reaction chamber 8), and the energy produced by oxidizing the captured fuel can be used, at least partially, to drive the turbine 5.

For example, the system 300 can capture and utilize fuel leaked to an exterior of the recuperator housing 10 through loose or imperfect bolts, shaft seals, pipe joints, and/or possibly several other types of junctions. Examples of such leaks are illustrated as leak paths 9k (at a juncture in the housing of the compressor 4), 9l (at a juncture in the housing of the compressor 4), 9m (at the juncture of the end housing 10b and the main housing 10a), 9n (at the juncture of the main body 12a and the primary reaction chamber 8). A leak collection envelope 30 is configured to surround all illustrated external fuel leak paths. The envelope 30 can define an atmosphere surrounding the gas turbine system. The envelope 30 can use incoming air 34 through opening 33 to sweep leaked fuel into the compressor intake, thereby trapping and recycling fuel leaked to the atmosphere defined by the envelope 30. In some implementations, the pressure inside the envelope is slightly below atmospheric pressure outside of the envelope 30. Consequently, the envelope 30 can operate without a less than air-tight seal. For example, the envelope 30 can be sufficiently snug such that leaked fuel is substantially contained within the envelope 30. In some implementations, the envelope 30 can be used in combination with other leak management systems.

The leak collection envelope 30 may be made of various materials, for example, plastics, aluminum, and/or steel. The envelope 30 may be flexible or rigid. The envelope 30 may be a loose, fitted, shaped, or molded cover. While the envelope 30 is illustrated as a large bubble, the envelope 30 may define several smaller bubbles or housings. A single envelope 30 may enclose a single gas turbine system or many gas turbine systems. For example, the envelope 30 could be a solid shelter, and may house one or more gas turbine systems. As another example, the envelope 30 can be a plastic sheath or tent encapsulating one or more gas turbine systems.

In FIG. 3B, the example system 300 additionally includes a fuel-emitting source 31 that emits fuel 32. Fuel 32 from the fuel-emitting source 31 can be treated similarly as the externally-leaked fuel (e.g. the fuel leaked through leak paths 9k, 9l, 9m, and 9n). The fuel 32 can be accumulated in the gas turbine system intake and oxidized in the secondary reaction chamber 7 (or the primary reaction chamber 8).

The fuel-emitting source 31 can be a natural (e.g. non-anthropological) fuel source or a human-made (e.g. anthropological) fuel source. For example, the envelope 30 can enclose the gas turbine as well as grazing cattle, and the fuel source could include methane from cattle belches. As another example, the envelope 30 could enclose a swamp, rice farm, or part of a swampland, and the fuel 32 can include methane produced by a fermentation of organic matter in the swamp. Other fuel sources can include manure, municipal waste, and wetlands. The envelope 30 can enclose a small volume (e.g. less than 50 cubic feet) or a large volume (e.g. stretching over many acres of swampland).

Figure 4:
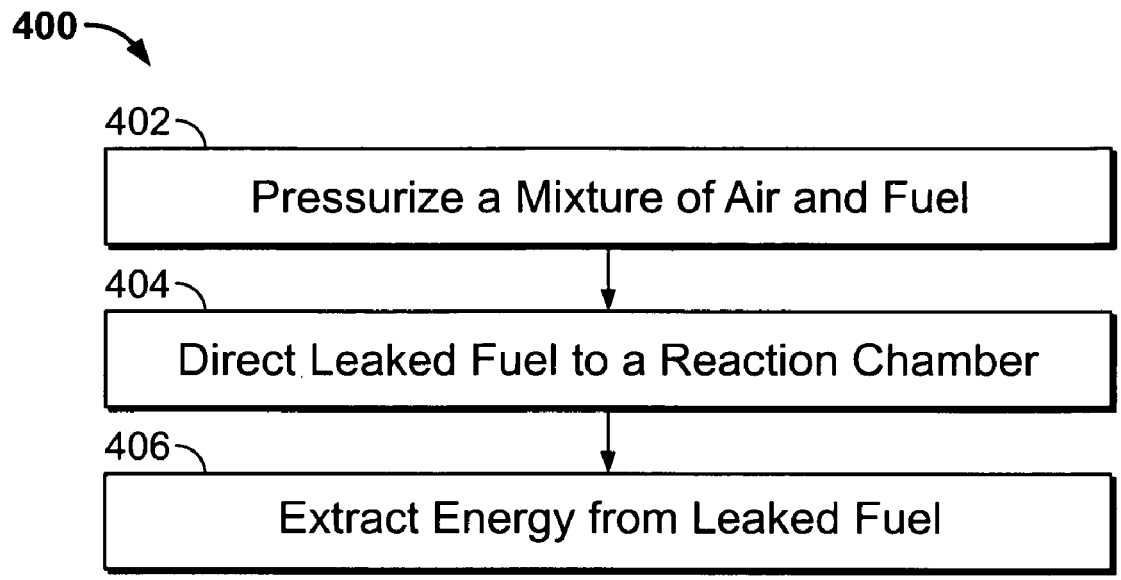
FIG. 4 is a flow chart illustrating an example process for managing leaks in a gas turbine system in accordance with some aspects of the present disclosure.

FIG. 4 is a flow chart illustrating an example process 400 for managing leaked fuel in a gas turbine system in accordance with some aspects of the present disclosure. The process 400 may be useful for reducing the release of fuel and/or pollutants into the environment from the gas turbine system. The process 400 may also enhance the fuel economy of a gas turbine system by utilizing a greater percentage of fuel. According to some implementations, the process 400 may include different, additional, or fewer operations.

At 402, a mixture of air and fuel is pressurized in a gas turbine system. The mixture can be a substantially homogeneous mixture where the fuel is substantially uniformly distributed through the mixture. For example, air and fuel may be mixed in a mixer and pressurized in a compressor of the gas turbine system. The compressor may be powered by the rotation of a turbine of the gas turbine system. The fuel may include weak fuels (e.g. methane or ethane), and the air and fuel mixture may have a low energy density (e.g. 10 to 30 British thermal units (btu) per standard cubic foot (scf)). As an example of a weak fuel, gas emanating from landfill may contain only a small percentage of methane (e.g. 2 percent). A gas having such a low concentration of methane may be too weak to sustain combustion. In fact, a spark or flame introduced to the gas, even in the presence of air, can be snuffed out by the gas. However, when the gas is raised to a temperature above the auto-ignition temperature of methane, the methane can oxidize in the presence of air without introduction of a spark or flame.

The gas turbine system may have a primary flow path for the unoxidized air and fuel mixture. The primary flow path may include, for example, the mixer, the compressor, a heat exchanger, the reaction chamber, and/or other elements. Downstream from the primary flow path for the unoxidized air and fuel mixture (e.g. downstream from the reaction chamber), an exhaust flow path may be provided. For example, the exhaust flow path may include the turbine, the heat exchanger, and/or other elements.

At 404, leaked fuel is directed to a reaction chamber of the gas turbine system. The leaked fuel may be directed from a leak location into the primary flow path. For example, the leaked fuel may be directed to a location upstream or downstream of the compressor or to an inlet of the reaction chamber. The fuel leak may be directed to a location based on the pressure of the fuel leak. For example, if the leaked fuel has a pressure equal to or higher than the inlet of the reaction chamber, the fuel may be directed to the inlet of the reaction chamber. On the other hand, if the leaked fuel has a pressure less than the inlet of the reaction chamber, the fuel may be directed to the compressor.

At 406, energy is extracted from the leaked fuel. For example, the leaked fuel may be oxidized in the reaction chamber, and the energy released by the oxidation reaction may be used to drive the turbine of the gas turbine system. The leaked fuel may be completely oxidized in the reaction chamber, preventing substantially any unoxidized fuel from entering the exhaust path.

Figure 5:
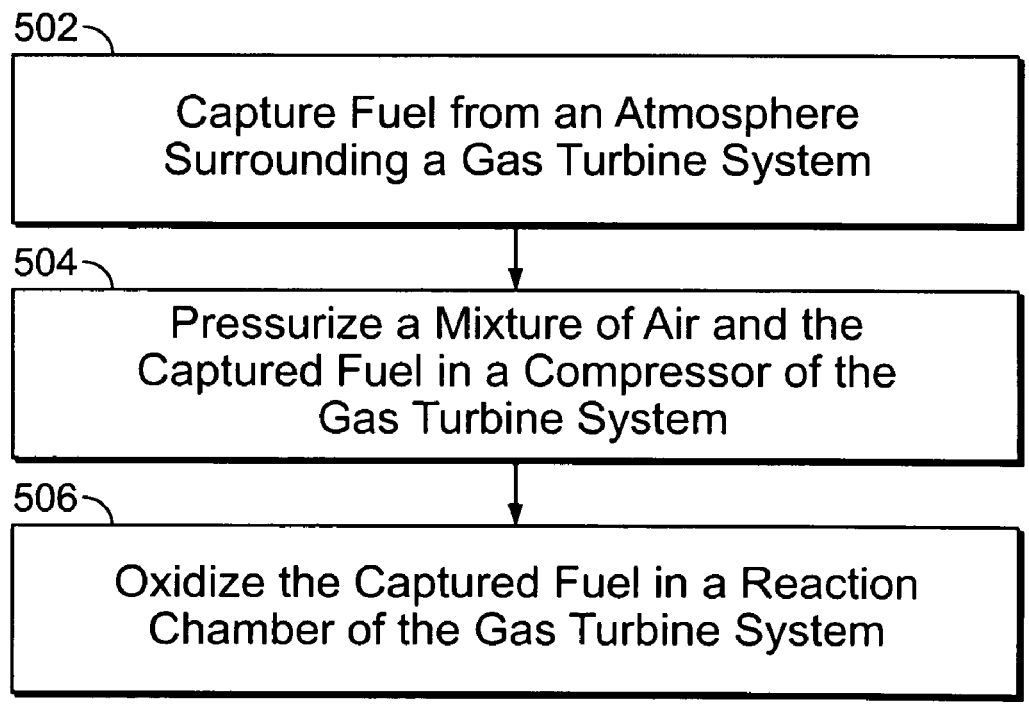
FIG. 5 is a flow chart illustrating an example process for managing leaks in a gas turbine system in accordance with some aspects of the present disclosure.

FIG. 5 is a flow chart illustrating an example process 500 for managing fuel in a gas turbine system in accordance with some aspects of the present disclosure. The process 500 may be useful for reducing the release of fuel and/or pollutants into the environment from the gas turbine system. The process 500 may also utilize weak fuel (e.g. methane) and/or low volumetric energy density fuel from a fuel production source, such as a swamp or cattle belch. According to some implementations, the process 500 may include different, additional, or fewer operations.

At 502, fuel is captured from an atmosphere surrounding a gas turbine system. The fuel may have entered the atmosphere through an external leak in the gas turbine system. The fuel may have entered the atmosphere through the exhaust of the gas turbine system. The fuel may have entered the atmosphere through a leak or an exhaust of a different gas turbine system. The fuel may have entered the atmosphere from an anthropological or non-anthropological fuel production source (e.g. manure or municipal waste).

In some implementations, the fuel is captured by an envelope (e.g. a sheath, a bubble, a cover) enclosing the gas turbine system. In some implementations, the fuel is captured by a first envelope (e.g. a sheath, a bubble, a cover) enclosing the fuel production source, the captured fuel is directed to the fuel intake of the gas turbine system, and the gas turbine is covered by a second envelope.

At 504, the captured fuel is mixed with air, and the air and fuel mixture is pressurized in a compressor of the gas turbine system. The captured fuel may be mixed with additional and/or different fuel. In some implementations, the captured fuel is a small percentage of the fuel in the air and fuel mixture. In other implementations, the majority of the fuel in the air and fuel mixture is the captured fuel.

At 506, the captured fuel is oxidized in a reaction chamber of the gas turbine system. The oxidation product may drive a turbine of the gas turbine system. In some implementations, oxidation of the captured fuel makes only a small contribution to the heat energy that drives the turbine. In some implementations, oxidation of the captured fuel serves as the primary source of heat energy in the gas turbine system.

Figure 6:
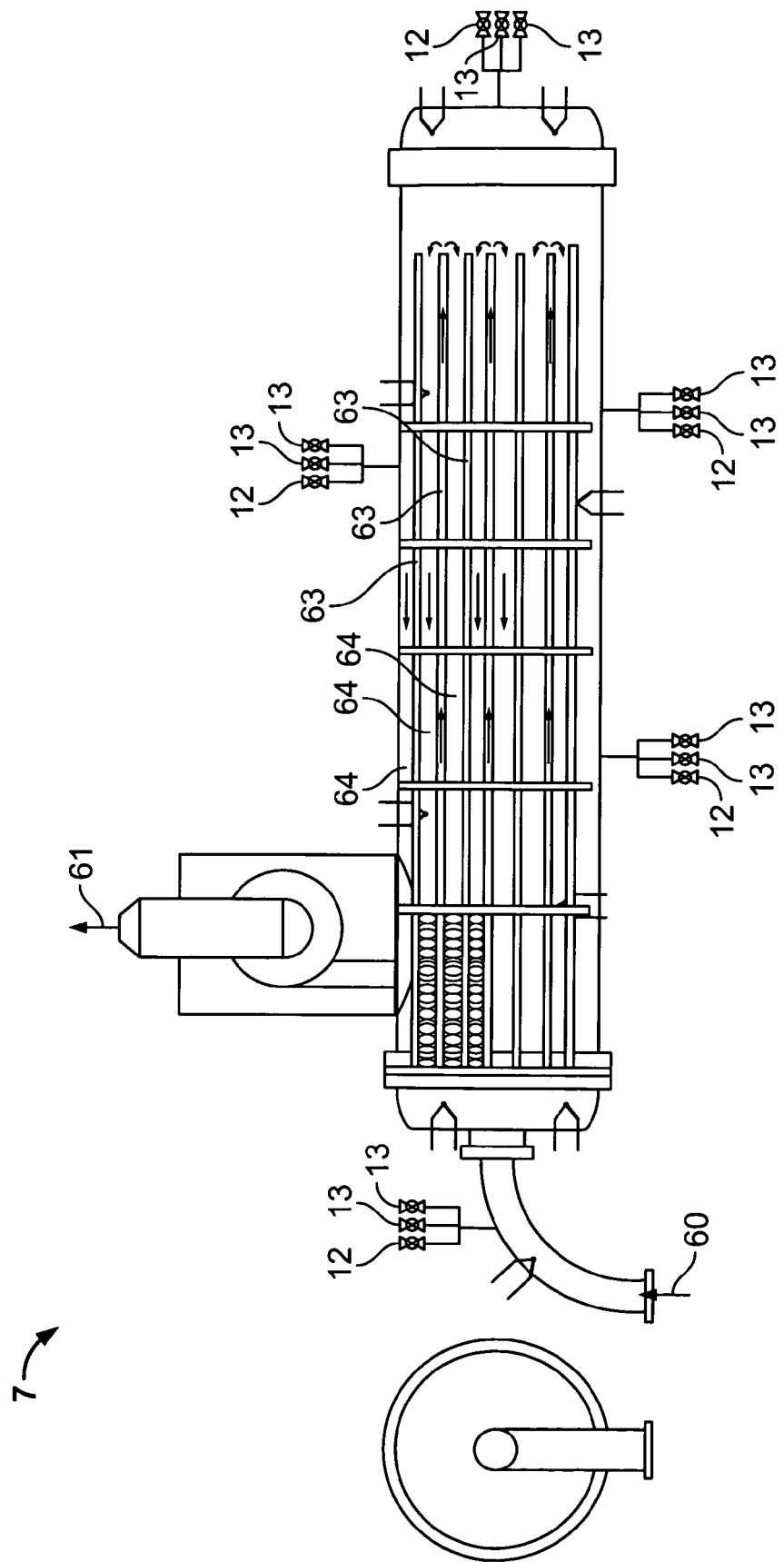
FIG. 6 is a diagram illustrating an example reaction chamber in accordance with some aspects of the present disclosure.

FIG. 6 is a diagram illustrating an example reaction chamber 7. The secondary reaction chamber 7 includes an inlet 60, a body 62, and an outlet 61. The body 62 defines a flow path between the inlet 60 and the outlet 61. The inlet 60 may be in fluid communication with the heat exchanger 6 of FIG. 1 or the reaction chamber 8 of FIG. 1. The outlet 61 may be in fluid communication with the turbine 5 of FIG. 1. An air and fuel mixture can enter the inlet 60 and flow along a first flow path 63 though the body 62. Upon reaching the end of the flow path 63, the air and fuel mixture can flow along a second flow path 64. While flowing through the flow paths 63 and 64 some or all of the fuel may be oxidized, and the oxidation product, along with any unoxidized portion of the air and fuel mixture, can exit the reaction chamber 7 through the outlet 61.

The second flow path 64 may include insulating refractory material, high temperature heat-absorbing material, and/or heat-resistant material, such as ceramic or rock. While flowing along the flow path 64, the fuel may be oxidized as the air and fuel mixture is heated above the fuel's auto-ignition temperature. As the fuel is oxidized, the fuel may impart heat to the materials defining the flow path 64. Heat energy from the oxidation reaction may also be transferred to the surfaces defining the flow path 63. In this manner, the air and fuel mixture flowing along the flow paths 63 may acquire heat energy from the oxidation of fuel flowing along the flow path 64. In some implementations, the temperature of the air and fuel mixture may increase steadily while flowing along the flow paths 63 and 64, reaching the auto-ignition temperature of the fuel while flowing along the flow path 64.

A number of embodiments have been described. Nevertheless, it will be understood that various modifications may be made without departing from the scope of the present disclosure. Accordingly, other embodiments are within the scope of the following claims.

What is claimed is:

1. A method for managing leaks containing fuel in a gas turbine system, the method comprising:
   directing a compressed air and fuel mixture through a primary flow path through components of the gas turbine system, the components including a heat exchanger, a first reaction chamber, and a second reaction chamber;
   receiving the compressed air and fuel mixture at a plurality of junctions between the components of the gas turbine system along the primary flow path;
   directing a portion of the compressed air and fuel mixture, leaked from at least one of the plurality of junctions along a first leak path, to the second reaction chamber, downstream of the first reaction chamber, whereby the first leak path bypasses the heat exchanger; and
   oxidizing at least a portion of the leaked compressed air and fuel mixture in the second reaction chamber.

2. The method of claim 1, further comprising converting energy released by oxidation of the leaked compressed air and fuel mixture into mechanical motion.

3. The method of claim 1, wherein oxidizing at least a portion of the leaked compressed air and fuel mixture in the second reaction chamber comprises raising a temperature of the leaked compressed air and fuel mixture to a temperature at or above an auto-ignition temperature of the fuel.

4. The method of claim 1, further comprising directing another portion of the compressed air and fuel mixture, leaked from a junction along the primary flow path between the heat exchanger and the first reaction chamber, into a second leak path to the second reaction chamber, whereby the second leak path bypasses the first reaction chamber.

5. The method of claim 1, whereby the first leak path bypasses the first reaction chamber.

6. A method for managing leaked fuel in a gas turbine system, the method comprising:
   directing a compressed air and fuel mixture along a primary flow path through a heat exchanger, a first reaction chamber, and a second reaction chamber of a gas turbine system;
   receiving the compressed air and fuel mixture at a leak location along the primary flow path, the leak location allowing the compressed air and fuel mixture to leak along a first leak path from upstream of the primary reaction chamber to downstream of the primary reaction chamber;
   directing a portion of the compressed air and fuel mixture, leaked from the leak location, along the first leak path to the secondary reaction chamber, whereby the first leak path bypasses the heat exchanger; and
   oxidizing at least a portion of the leaked compressed air and fuel mixture in the secondary reaction chamber.

7. The method of claim 6, further comprising converting energy released by oxidization of the leaked compressed air and fuel mixture into mechanical motion.

8. The method of claim 6, wherein the secondary reaction chamber is downstream of the primary reaction chamber.

9. The method of claim 6, wherein oxidizing at least a portion of the leaked compressed air and fuel mixture in the secondary reaction chamber comprises raising a temperature of the leaked compressed air and fuel mixture to a temperature at or above an auto-ignition temperature of the fuel.

10. The method of claim 6, further comprising directing another portion of the compressed air and fuel mixture, leaked from another leak location along the primary flow path between the heat exchanger and the first reaction chamber, into a second leak path to the second reaction chamber, whereby the second leak path bypasses the first reaction chamber.

* * * * *